Figure 1:
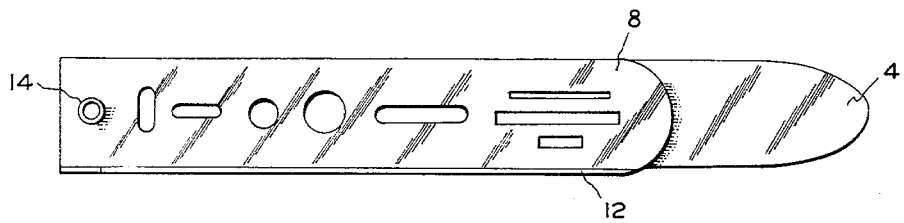

May 31, 1966  G. D. PRESTON  3,253,578

ERASER SHIELD

Filed Nov. 17, 1964

INVENTOR
GRACE D. PRESTON

BY *Fisher, Christen, Sabol & Caldwell*
ATTORNEYS

United States Patent Office 3,253,578
Patented May 31, 1966

3,253,578
ERASER SHIELD
Grace D. Preston, Washington, D.C., assignor to Eaton Allen Corp., New York, N.Y., a corporation of New York
Filed Nov. 17, 1964, Ser. No. 411,829
1 Claim. (Cl. 120—41)

This invention is an eraser shield for use on standard typewriters, for protecting the lower carbons from smudging when erasures are made on the original and the carbons.

The object of the invention is to provide an easily manipulated article, comprising upper and lower blades, preferably of transparent plastic, wherein the upper blade is provided with perforations of various sizes and shapes for the eraser. These blades are each convex, of about the curvature of the typewriter roller and fit one over the other. They are pivoted together at their left ends with an eyelet or the like, so that the upper blade can be pivoted about the eyelet in substantially its own plane.

The lower front edge of the upper plate is provided with a longitudinally extending lower flange which serves as a manipulating handle and for catching dust and eraser particles. The lower blade is preferably longer than the upper blade, so as to reach entirely across the typewriter paper. Other advantages will be set forth in connection with the accompanying drawing.

Figure 2:
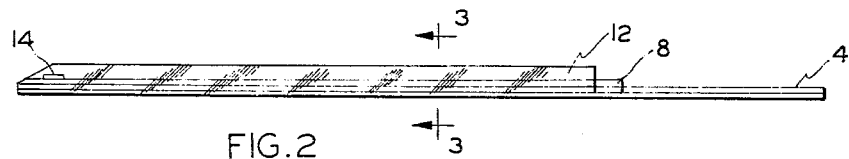
Figure 4:
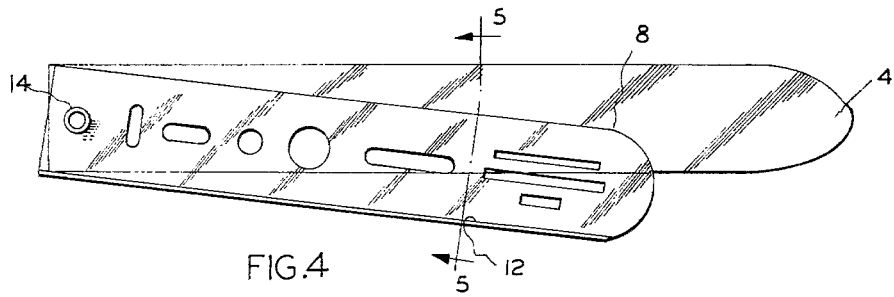
Figure 3:
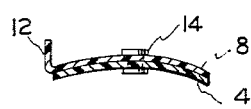
Figure 5:

The best mode of practicing the invention is shown in the drawings, wherein:

FIG. 1 is a top plan view of my eraser shield;
FIG. 2 is an edge view of FIG. 1;
FIG. 3 is a cross section on lines 3—3 of FIG. 2;
FIG. 4 is a plan view of the eraser shield in another position; and
FIG. 5 is a sectional view on lines 5—5 of FIG. 4.

Referring now to these drawings, the bottom blade 2 of flexible, thin plastic material, is concave on its lower surface to fit over and conform to the configuration of the typewriter roller. It is of a length of about the width of typewriter paper, and conveniently about one inch wide and tapered at one end 4.

The upper blade 8 is of similar thin, flexible, transparent material, somewhat shorter than the lower blade 2, and tapered at one end.

The upper blade 8 is concave on its lower surface, of about the same curvature as the upper blade 2. It is provided with a longitudinally extending flange 12, preferably perpendicular to blade 8, which serves as a manipulating handle and for catching erased particles, which are discarded.

The lower and upper blades are pivoted together by an eyelet or other pivot 14 at their left ends, so that they can be moved about said pivot in substantially their own planes. Being curved, such movement is not strictly a movement in a plane.

When the two blades are moved about this pivot, the fact that both are concave causes a slight, frictional binding between the two blades, so that there is a frictional engagement between the blades which tends to hold them in any desired relative angular position.

The fact that the bottom blade is larger than the top blade facilitates the ease of sliding the bottom blade beneath the sheet to be corrected.

Operation: Lift the wire guard on the typewriter up out of the way. Then pick up the eraser shield between forefinger and thumb and hold them apart. Then shove the lower blade, from the top of the paper, down behind the page to be erased. Then shove the entire shield into position on the typewriter roller and erase through the holes in the top blade. When the first page is finished, the carbons should not be touched. Using the shield as a tool, pull it out of the first used position, flip the page and carbon forward, using the shield as an instrument for such flipping. This keeps the fingers free from carbon smudges. This procedure is repeated for the following carbon copies until all corrections are made. Then all pages are flipped backward against the platen to their original position to resume typing.

I claim as my invention:

An eraser shield for a typewriter comprising upper and lower elongated blades, said blades being pivotally attached to each other at one end so that the upper blade may overlie the lower blade and be in contact therewith and so that they are relatively movable sidewise about said pivot, the lower blade being imperforate and concave and adapted to conform to the configuration of the convex roller of the typewriter and underlie a sheet of typewriter paper when in a typewriter and being of a length to reach substantially entirely across the typewriter paper, the upper blade being transparent and flexible and conforms to the curvature of the lower blade and being provided with perforations for use with an eraser and adapted to overlie the typewriter paper, the lower edge of said upper blade having a longitudinally extending flange co-extensive therewith which extends forwardly and upwardly therefrom, said flange being adapted to receive particles from the eraser and prevent them from falling into the typewriter.

References Cited by the Examiner
UNITED STATES PATENTS

| | | | |
|---|---|---|---|
| 680,227 | 8/1901 | Copland | 120—41 |
| 876,451 | 1/1908 | Hall | 120—41 |
| 2,755,773 | 7/1956 | Haynie. | |

LAWRENCE CHARLES, *Primary Examiner.*